(12) United States Patent
Zhang et al.

(10) Patent No.: US 12,197,882 B2
(45) Date of Patent: Jan. 14, 2025

(54) TRANSLATION METHOD, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Ruiqing Zhang, Beijing (CN); Xiyang Wang, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 282 days.

(21) Appl. No.: 17/885,152

(22) Filed: Aug. 10, 2022

(65) Prior Publication Data

US 2023/0153548 A1 May 18, 2023

(30) Foreign Application Priority Data

Nov. 15, 2021 (CN) .......................... 202111349569.5

(51) Int. Cl.
*G06F 40/58* (2020.01)

(52) U.S. Cl.
CPC .................................... *G06F 40/58* (2020.01)

(58) Field of Classification Search
CPC ........... G06F 40/58; G06F 40/51; G06F 40/44
See application file for complete search history.

(56) References Cited

U.S. PATENT DOCUMENTS

| | | | |
|---|---|---|---|
| 2009/0248422 A1* | 10/2009 | Li | G06F 40/44 704/277 |
| 2014/0249798 A1* | 9/2014 | Sun | G06F 40/58 704/3 |
| 2018/0314689 A1* | 11/2018 | Wang | G10L 15/1822 |
| 2021/0042475 A1* | 2/2021 | Zhang | G06F 40/47 |

FOREIGN PATENT DOCUMENTS

| | | |
|---|---|---|
| CN | 111079449 A | 4/2020 |
| CN | 111680527 A | 9/2020 |
| CN | 111859997 A | 10/2020 |

* cited by examiner

*Primary Examiner* — Daniel C Washburn
*Assistant Examiner* — Athar N Pasha
(74) *Attorney, Agent, or Firm* — Brooks Kushman P.C.

(57) ABSTRACT

A translation method, an electronic device and a storage medium, which relate to the field of artificial intelligence technologies, such as machine learning technologies, information processing technologies, are disclosed. An implementation includes: acquiring an intermediate translation result generated by each of multiple pre-trained translation models for a to-be-translated specified sentence in a same iteration of a translation process, so as to obtain multiple intermediate translation results; acquiring a co-occurrence word based on the multiple intermediate translation results; and acquiring a target translation result of the specified sentence based on the co-occurrence word.

14 Claims, 7 Drawing Sheets

TRANSLATION METHOD, ELECTRONIC DEVICE AND STORAGE MEDIUM

CROSS-REFERENCE TO RELATED APPLICATIONS

The present disclosure claims the priority and benefit of Chinese Patent Application No. 202111349569.5, filed on Nov. 15, 2021, entitled "TRANSLATION METHOD AND APPARATUS, ELECTRONIC DEVICE AND STORAGE MEDIUM." The disclosure of the above application is incorporated herein by reference in its entirety.

TECHNICAL FIELD

The present disclosure relates to the field of computer technologies, particularly relates to the field of artificial intelligence technologies, such as machine learning technologies, information processing technologies, and more particularly to a translation method, an electronic device and a storage medium.

BACKGROUND

Translation is quite technical and professional work, and is completed by a professional human translator in a traditional technology.

In recent years, with a development of artificial intelligence, a translation model implemented based on artificial intelligence may greatly improve an efficiency of the translation. The translation model may be implemented using a neural network model. During usage, the translation model may be subjected to a supervised training operation using manually annotated training data. In use, a to-be-translated sentence is input into the translation model, and the translation model will output a translated sentence.

SUMMARY

The present disclosure provides a translation method, an electronic device and a storage medium.

According to one aspect of the present disclosure, there is provided a translation method, including acquiring an intermediate translation result generated by each of multiple pre-trained translation models for a to-be-translated specified sentence in a same iteration of a translation process, so as to obtain multiple intermediate translation results; acquiring a co-occurrence word based on the multiple intermediate translation results; and acquiring a target translation result of the specified sentence based on the co-occurrence word.

According to another aspect of the present disclosure, there is provided an electronic device, including at least one processor; and a memory connected with the at least one processor communicatively; where the memory stores instructions executable by the at least one processor to enable the at least one processor to perform the method of the aspect as described above and any possible implementation.

According to yet another aspect of the present disclosure, there is provided a non-transitory computer readable storage medium with computer instructions stored thereon, where the computer instructions are used for causing a computer to perform the method of the aspect as described above and any possible implementation.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Machine translation (MT) may be defined as: input: a source language sentence containing n words $X=(x_1, x_2, \ldots, x_n)$; and output: a translation result $Y=(y_1, y_2, \ldots, y_m)$ corresponding to X, where an ith word translated on a target side may be represented as $y_i$, and may also be referred to as an ith token in a neural network model.

In iterative non-autoregressive machine translation (NAT) models, a single translation model is used for inference, and multiple translation models cannot be used for fusion. Translation quality of the iterative NAT model may be improved using the fusion of the multiple translation models.

Figure 1A:
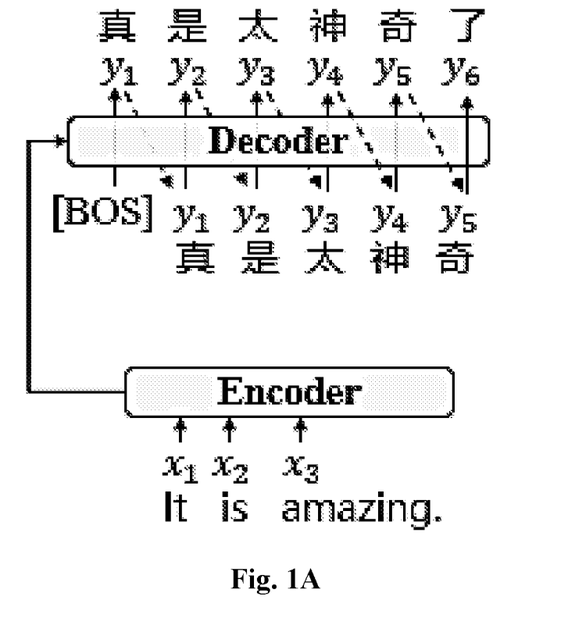
FIG. 1A is a translation principle diagram of an autoregressive model according to the present disclosure.
Figure 1B:
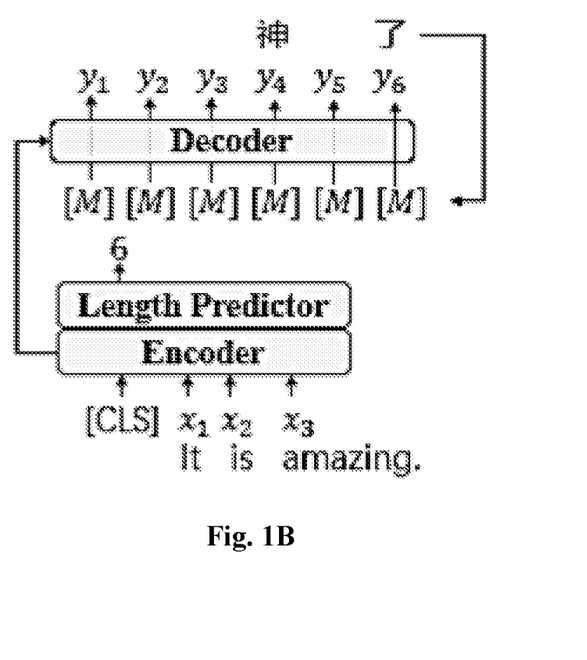
FIG. 1B is a translation principle diagram of a non-autoregressive model according to the present disclosure.

FIG. 1A is a translation principle diagram of an autoregressive model according to the present disclosure; and FIG. 1B is a translation principle diagram of a non-autoregressive model according to the present disclosure. Taking original text "It is amazing" and a target translation result " 真是太神奇了 (Zhen shi tai shen qi le)" as an example, as shown in FIG. 1A, the autoregressive model is required to perform an m-step decoding operation to generate a translation result with a length m, which has an obvious disadvantage of a low speed. To solve the m-step decoding problem caused by dependency on the target side, the non-autoregressive translation model shown in FIG. 1B may be adopted. As shown in FIG. 1B, translation may be achieved by a two-step decoding operation. In the first step, X is encoded, a length is predicted, and then, the input is changed to [M] with a corresponding length, i.e., [Mask]. These [M] s are predicted into corresponding target words using a decoder for parallel decoding, and a complete sentence translation result is generated through multiple iterations; several words with high probabilities are selected and fixed in each iteration and used for generating other words in subsequent iterations. For example, in the first step, a predicted result is the result of the following table 1:

TABLE 1

| 0.6 | 0.7 | 0.6 | 0.9 | 0.7 | 0.8 |
|---|---|---|---|---|---|
| 这(zhe) | 可(ke) | 真(zhen) | 神(shen) | 奇(qi) | 了(le) |

Figure 1C:
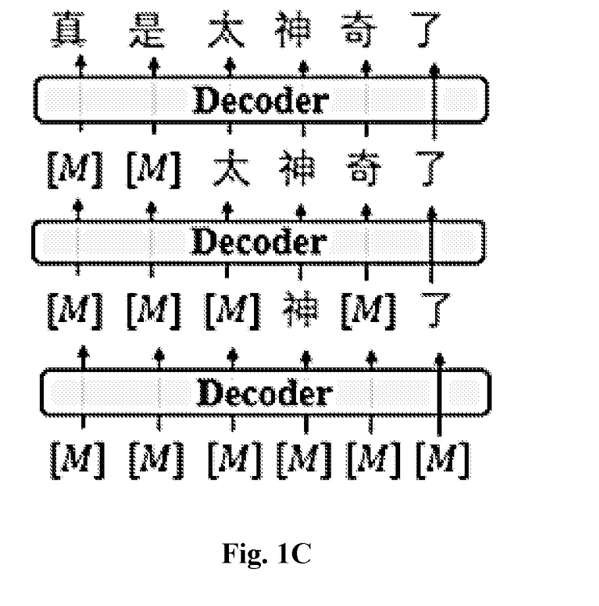
FIG. 1C is an ideal schematic translation diagram of the non-autoregressive model according to the present disclosure.
Figure 1D:
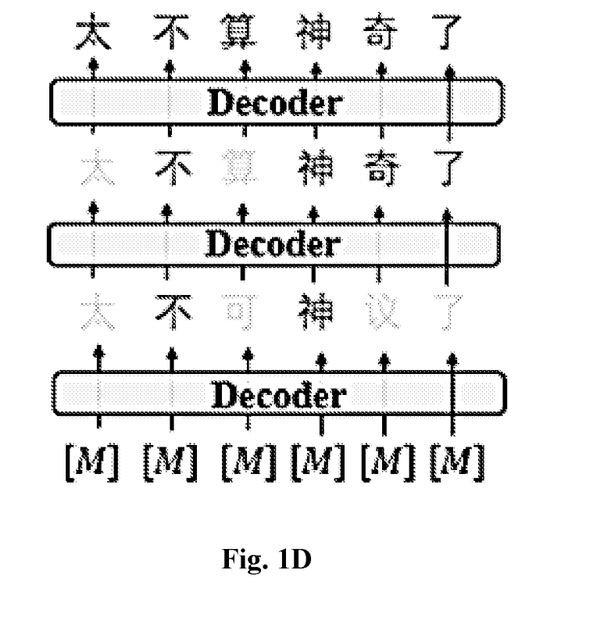
FIG. 1D is an actual schematic translation diagram of the non-autoregressive model according to the present disclosure.

If the model sets a number of the words determined each time as a number of tokens of ⅓ of the length of the target translation result, the number is 6/3=2 in the case of above Table 1. Then, "神" and "了" may be used as translation content determined in the first step. "[M] [M] [M] 神[M] 了" is input during the second decoding step of the decoder. FIG. 1C is an ideal schematic translation diagram of the non-autoregressive model according to the present disclosure; for example, "神" and "了" may be produced in the first step, "太" and "奇" may be iteratively produced in the second step, and all remaining words may be iteratively produced in a third step. FIG. 1D is an actual schematic translation diagram of the non-autoregressive model according to the present disclosure; FIG. 1D shows a problem which is prone to occur in a real scenario. Since an incorrect inference result "不" is generated and fixed in the first step, the following translation results are all wrong.

However, in practical applications, the following two translation results are applicable to "It is amazing":
"真是太神奇了 (Zhen shi tai shen qi le)"; and
"太不可思议了 (Tai bu ke si yi le)".

The model does not consider generation of a dependency relationship between tokens in a NAT generation mode, such that the model may produce the following results mixing the two translations in Table 2 during the first iteration:

TABLE 2

| 0.7 | 0.9 | 0.8 | 0.9 | 0.6 | 0.8 |
|---|---|---|---|---|---|
| 太(tai) | 不(bu) | 可(ke) | 神(shen) | 议(yi) | 了(le) |

If "不" and "神" are determined in this step, an error of a final translation result will be caused directly. As shown in FIG. 1D, light-colored words represent the tokens with output probabilities not ranking among the top ⅓ of the results output by the decoder, and dark-colored words represent the tokens inferred to be incorrect and correct in determined tokens.

Figure 2:
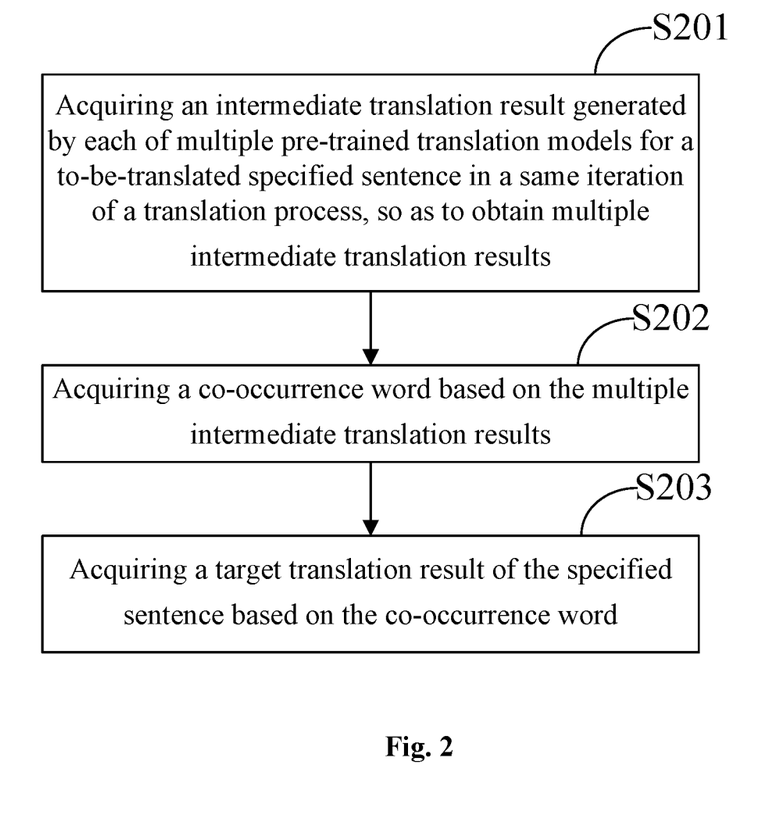
FIG. 2 is a schematic diagram according to a first embodiment of the present disclosure.

FIG. 2 is a schematic diagram according to a first embodiment of the present disclosure; as shown in FIG. 2, this embodiment provides a translation method, which may be applied to a translation apparatus, and specifically includes the following steps:

S201: acquiring an intermediate translation result generated by each of multiple pre-trained translation models for a to-be-translated specified sentence in a same iteration of a translation process, so as to obtain multiple intermediate translation results.

The translation method according to this embodiment is applied to a translation apparatus incorporating multiple translation models. For example, in a process of translating the specified sentence by the multiple translation models in this embodiment, multiple iterations are required, and one candidate translation result is obtained in each iteration. After each intermediate iteration, one intermediate translation result is obtained.

Since the translation of the specified sentence by the multiple translation models in this embodiment is required to be completed through the multiple iterations, optionally, the multiple translation models in this embodiment may be non-autoregressive translation models. For an implementation principle of the non-autoregressive translation model, reference may be made to the related descriptions of FIGS. 1B and 1C. Optionally, the multiple translation models may also be other models required to obtain translation results through multiple iterations, which is not limited herein.

The multiple intermediate translation results obtained in the step are generated by different translation models in the same iteration. For example, the intermediate translation result generated by each of the multiple translation models in the first iteration is selected to obtain the multiple intermediate translation results. Then, each translation model continues to perform a second iteration to generate a further intermediate translation result based on the intermediate translation result generated in the first iteration, and with the method according to this embodiment, the intermediate translation result generated by each of the multiple translation models in the second iteration may be selected to obtain the multiple intermediate translation results; by analogy, an intermediate translation result generated by each of the multiple translation models in any same iteration of the translation process may be selected to obtain the multiple intermediate translation results.

S202: acquiring a co-occurrence word based on the multiple intermediate translation results.

Each intermediate translation result in this embodiment includes multiple words. The co-occurrence word in this embodiment is a word co-occurring in at least two of the multiple intermediate translation results.

S203: acquiring a target translation result of the specified sentence based on the co-occurrence word.

The multiple intermediate translation results are generated by different translation models, if the co-occurrence word appears in the intermediate translation results generated by different translation models, the result translated by the translation model has a greater probability of being the target translation result, and if the co-occurrence word does not appear in the translation result, the result translated by the corresponding translation model has a smaller probability of being the target translation result. Based on this concept, in this embodiment, the target translation result of the specified sentence may be acquired based on the co-occurrence word, thus improving the accuracy of acquiring the target translation result.

In the translation method according to this embodiment, with the above technical solution, acquirement of the target translation result of the specified sentence is realized based on the co-occurrence word, which may effectively avoid confusion of the target translation result by a non-co-occurrence word, thus effectively improving the translation accuracy.

Figure 3:
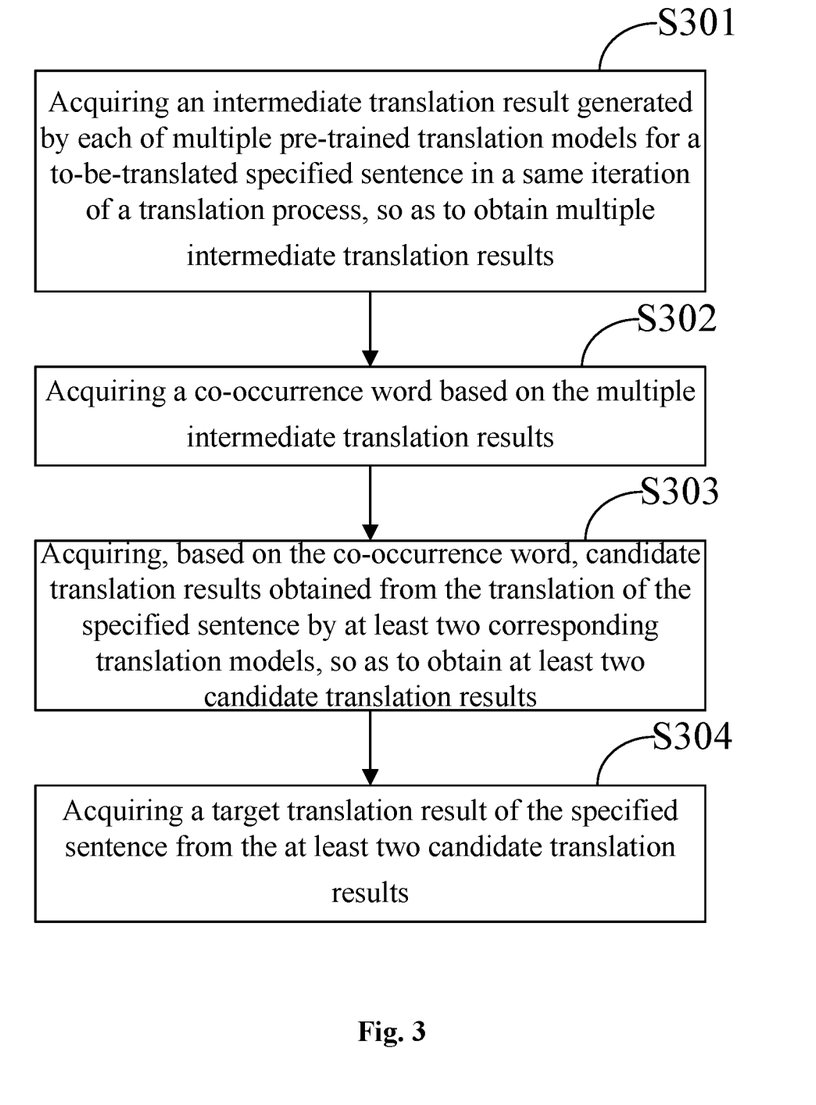
FIG. 3 is a schematic diagram according to a second embodiment of the present disclosure.

FIG. 3 is a schematic diagram according to a second embodiment of the present disclosure; as shown in FIG. 3, this embodiment provides a translation method, and the technical solution of the present disclosure is further introduced in more detail based on the technical solution of the above-mentioned embodiment shown in FIG. 2. As shown in FIG. 3, the translation method may include the following steps:

S301: acquiring an intermediate translation result generated by each of multiple pre-trained translation models for a to-be-translated specified sentence in a same iteration of a translation process, so as to obtain multiple intermediate translation results.

S302: acquiring a co-occurrence word based on the multiple intermediate translation results.

S303: acquiring, based on the co-occurrence word, candidate translation results obtained from the translation of the specified sentence by at least two corresponding translation models, so as to obtain at least two candidate translation results.

The co-occurrence word appears in at least two intermediate translation results, each intermediate translation result corresponds to one translation model, at least two intermediate translation results correspond to at least two translation models, and the at least two translation models necessarily correspond to at least two candidate translation results of the specified sentence, thereby obtaining the at least two candidate translation results.

In this embodiment, the at least two candidate translation results may be acquired based on the co-occurrence word in any iteration. The at least two candidate translation results may also be acquired based on the co-occurrence word in each iteration.

S304: acquiring a target translation result of the specified sentence from the at least two candidate translation results.

A probability corresponding to the candidate translation result will be output while each translation model finally outputs the candidate translation result. In this embodiment, the final target translation result of the specified sentence may be determined using the probability of each candidate translation result.

For example, according to the probability of each candidate translation result, the candidate translation result with the highest probability may be acquired from the at least two candidate translation results as the target translation result of the specified sentence, which may ensure that the acquired target translation result is a most effective and accurate translation result.

Optionally, the target translation result of the specified sentence may also be acquired from the at least two candidate translation results with other methods; for example, a scoring model may be used to score based on each candidate translation result and the specified sentence to acquire a score of the candidate translation result, so as to identify the accuracy of the translation of the candidate translation result of the specified sentence. Further, according to the scores of the at least two candidate translation results, the candidate translation result with the highest score may be acquired as the target translation result of the specified sentence. In addition, the target translation result of the specified sentence may be acquired from the at least two candidate translation results with other methods, which is not limited herein.

The steps S303-S304 in this embodiment are an implementation of the step S203 in the above-mentioned embodiment shown in FIG. 2.

In the translation method according to this embodiment, with the above technical solution, based on the co-occurrence word, the candidate translation results obtained from the translation of the specified sentence by the at least two corresponding translation models are acquired to obtain the at least two candidate translation results; and then, the target translation result of the specified sentence is acquired from the at least two candidate translation results, such that the target translation result may be acquired based on the co-occurrence word, confusion of the target translation result by a non-co-occurrence word is effectively avoided, and the translation accuracy may be guaranteed effectively.

Figure 4:
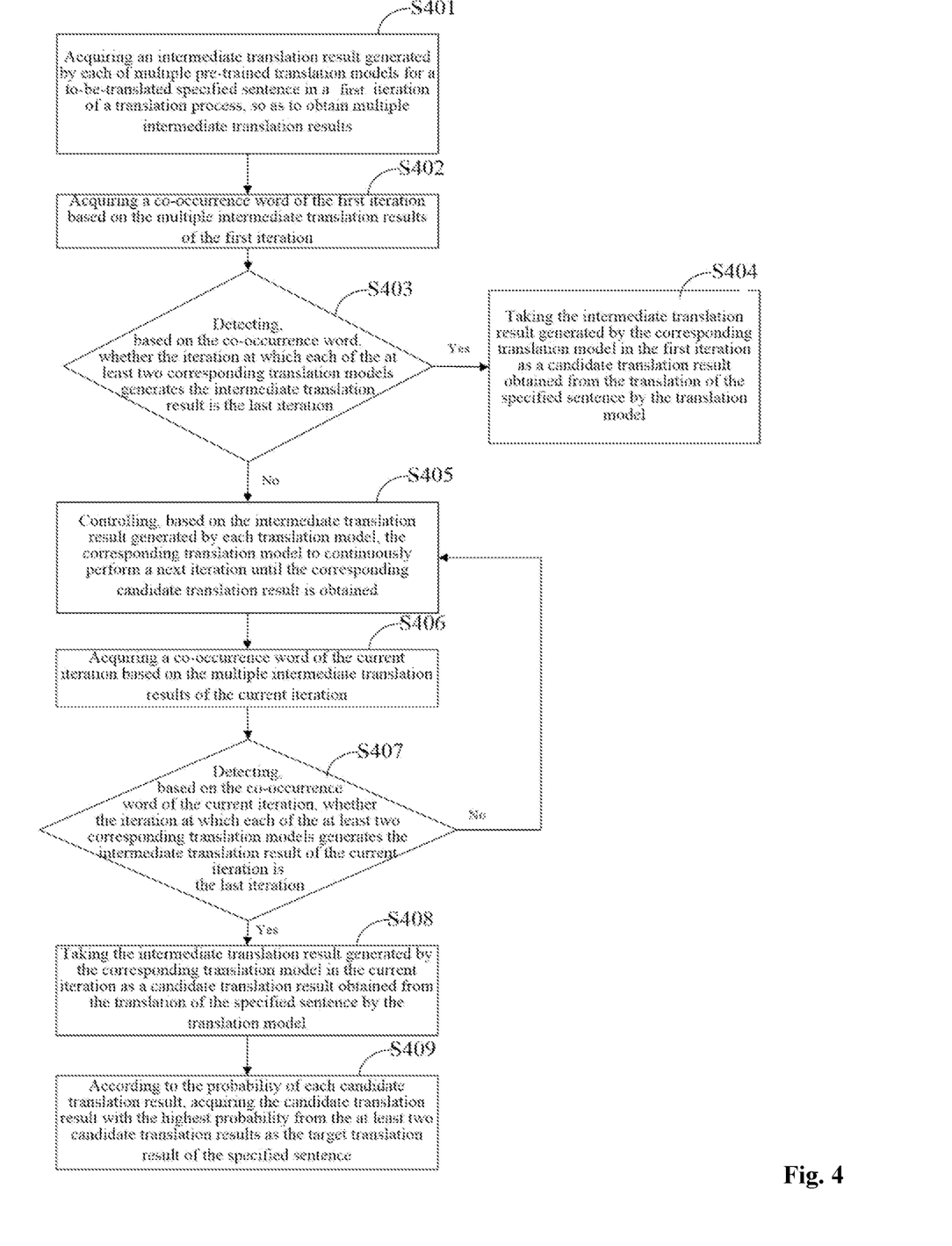
FIG. 4 is a schematic diagram according to a third embodiment of the present disclosure.

FIG. 4 is a schematic diagram according to a third embodiment of the present disclosure; as shown in FIG. 4, this embodiment provides a translation method, and the technical solution of the present disclosure is further introduced in more detail based on the technical solution of the above-mentioned embodiment shown in FIG. 3. As shown in FIG. 4, the translation method may include the following steps:

S401: acquiring an intermediate translation result generated by each of multiple pre-trained translation models for a to-be-translated specified sentence in a first iteration of a translation process, so as to obtain multiple intermediate translation results of the first iteration.

S402: acquiring a co-occurrence word of the first iteration based on the multiple intermediate translation results of the first iteration.

S403: detecting, based on the co-occurrence word of the first iteration, whether the iteration at which each of the at least two corresponding translation models generates the intermediate translation result of the first iteration is the last iteration; if the iteration is the last iteration, executing step S404; if the iteration is no the last iteration, executing step S405.

Specifically, it may be detected whether the intermediate translation result obtained in this iteration includes other untranslated token(s) in addition to the co-occurrence word, if other untranslated token(s) is (are) included, the iteration is not the last iteration, and iterative translation is required to continue, and if no other untranslated token is included, the iterative translation is not required to continue, and this iteration is the last iteration.

S404: taking the intermediate translation result generated by the corresponding translation model in the first iteration as a candidate translation result obtained from the translation of the specified sentence by the translation model; then executing step 409.

S405: controlling, based on the intermediate translation result of each of the at least two translation models in the previous iteration, the corresponding translation model to continuously perform current iterative translation, so as to obtain at least two intermediate translation results of the current iteration; then executing step 406.

S406: acquiring a co-occurrence word of the current iteration based on the multiple intermediate translation results of the current iteration; then executing step 407.

S407: detecting, based on the co-occurrence word of the current iteration, whether the iteration at which each of the at least two corresponding translation models generates the intermediate translation result of the current iteration is the last iteration; if the current iteration is the last iteration, executing step S408; if the current iteration is not the last iteration, executing step S405.

S408: taking the intermediate translation result generated by the corresponding translation model in the current iteration as a candidate translation result obtained from the translation of the specified sentence by the translation model; then executing step 409.

Based on the above description, in this embodiment, in each iteration, the corresponding translation model is controlled to continuously perform a next iteration based on the co-occurrence word, and the process is repeated until the corresponding candidate translation result is acquired.

In this embodiment, for example, the co-occurrence word is screened in each iteration, and if there is an intermediate translation result without the co-occurrence word in any iteration, the translation result of the specified sentence by the corresponding translation model is not used as the target translation result.

In this embodiment, a number of words included in the intermediate translation result generated in each iteration, i.e., a number of tokens, may account for 1/N of the total length, N being any positive integer greater than 1. Alternatively, a number of tokens included in the intermediate result generated in each iteration may be set to any preset positive integer. Alternatively, a probability of a token included in the intermediate result generated in each iteration may be set to be greater than a preset probability threshold; that is, a number of the tokens is not set in this case. In practical applications, the setting may be performed according to requirements, and is not limited herein.

S409: acquiring, according to the probability of each candidate translation result, the candidate translation result with the highest probability from the at least two candidate translation results as the target translation result of the specified sentence.

Figure 5:
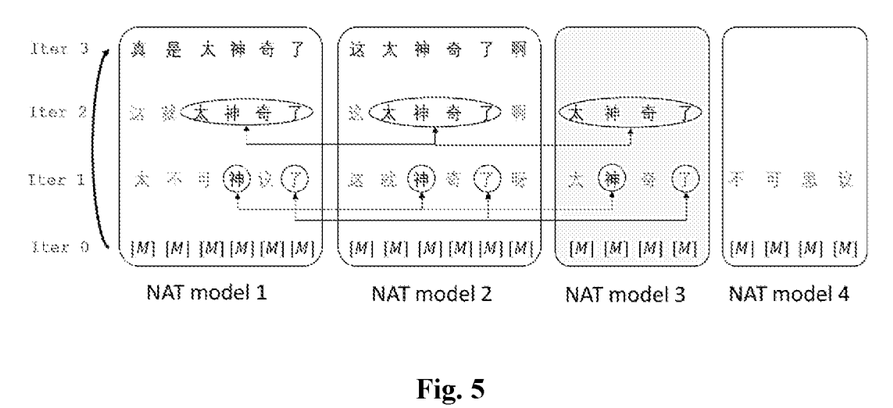
FIG. 5 is an example diagram of a translation method according to the present disclosure.

FIG. 5 is an example diagram of one translation method according to the present disclosure; and as shown in FIG. 5, a translation apparatus incorporating four translation models is taken as an example, and original text "It is amazing" and a target translation result " 真是太神奇 了 (Zhen shi tai shen qi le)" are taken as an example. As shown in FIG. 5, in a first iteration, an intermediate translation result of translation model 1 is " 神 (shen), 了 (le)"; an intermediate translation result of translation model 2 is " 神(shen), 了 (le)"; an intermediate translation result of translation model 3 is " 神 (shen), 了 (le)"; and an intermediate translation result of translation model 4 is any word of " 不 (bu), 可 (ke), 思 (si), 议 (yi)". In this way, in the intermediate translation results of the first iteration, a co-occurrence word exists in the intermediate translation results of the translation model 1, the translation model 2 and the translation model 3, and at this point, the intermediate translation result of the translation model 4 is discarded. Only the intermediate translation results of the translation model 1, the translation model 2 and the translation model 3 are considered.

Next, in a second iteration, an intermediate translation result determined by each translation model includes both a word newly generated in this step and the word determined in the previous iteration. If the intermediate translation results of the translation model 1, the translation model 2 and the translation model 3 in the second iteration are " 太 (tai), 神 (shen), 奇 (qi), 了 (le)", and the iteration of the translation model 3 in the second iteration is the last iteration, a corresponding candidate translation result " 太神奇了(Tai shen qi le)" is obtained. The translation model 1 and the translation model 2 continue to perform a next iteration, and finally, candidate translation results " 真是太神奇了 (Zhen shi tai shen qi le)" and "这太神奇了啊 (Zhe tai shen qi le a)" are obtained. Finally, according to a probability of each candidate translation result, the candidate translation result with the highest probability may be taken as the target translation result. For example, the translation result of the translation model 1 has the highest probability in this embodiment, and may be used as the target translation result.

In the translation method according to this embodiment, with the above technical solution, the translation result corresponding to the non-co-occurrence word may be discarded, and only the translation result corresponding to the co-occurrence word is taken as the candidate translation result, such that the target translation result is acquired from the at least two candidate translation results, confusion of the target translation result by the non-co-occurrence word is effectively avoided, and the translation accuracy is improved effectively.

Figure 6:
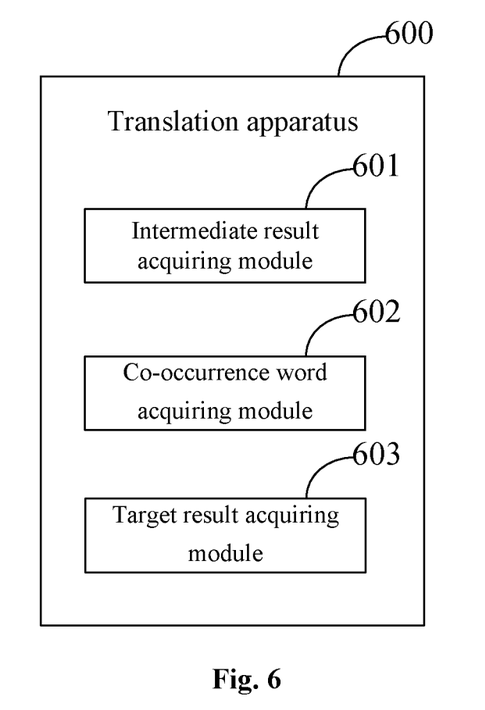
FIG. 6 is a schematic diagram according to a fourth embodiment of the present disclosure.

FIG. 6 is a schematic diagram according to a fourth embodiment of the present disclosure; as shown in FIG. 6, this embodiment provides a translation apparatus 600, including: an intermediate result acquiring module 601 configured to acquire an intermediate translation result generated by each of multiple pre-trained translation models for a to-be-translated specified sentence in a same iteration of a translation process, so as to obtain multiple intermediate translation results; a co-occurrence word acquiring module 602 configured to acquire a co-occurrence word based on the multiple intermediate translation results; and a target result acquiring module 603 configured to acquire a target translation result of the specified sentence based on the co-occurrence word.

The translation apparatus 600 according to this embodiment has the same implementation as the above-mentioned relevant method embodiment by adopting the above-mentioned modules to implement the implementation principle and the technical effects of the translation, and for details, reference may be made to the description of the above-mentioned relevant method embodiment, and details are not repeated herein.

Further optionally, in one embodiment of the present disclosure, the target result acquiring module 603 is configured to acquire, based on the co-occurrence word, candidate translation results obtained from the translation of the specified sentence by at least two corresponding translation models, so as to obtain at least two candidate translation results; and acquire the target translation result of the specified sentence from the at least two candidate translation results.

Further optionally, in one embodiment of the present disclosure, the target result acquiring module 603 is configured to acquire, according to a probability of each candidate translation result, the candidate translation result with the highest probability from the at least two candidate translation results as the target translation result of the specified sentence.

Further optionally, in one embodiment of the present disclosure, the target result acquiring module 603 is configured to detect, based on the co-occurrence word, whether the iteration at which each of the at least two corresponding translation models generates the intermediate translation result is the last iteration; and if the iteration is the last iteration, take the intermediate translation result generated by the corresponding translation model as a candidate translation result obtained from the translation of the specified sentence by the translation model.

Further optionally, in one embodiment of the present disclosure, the target result acquiring module 603 is configured to if the iteration at which each of the at least two corresponding translation models generates the intermediate translation result is not the last iteration, control, based on the intermediate translation result generated by each translation model, the corresponding translation model to continuously perform a next iteration until the corresponding candidate translation result is obtained.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 7:
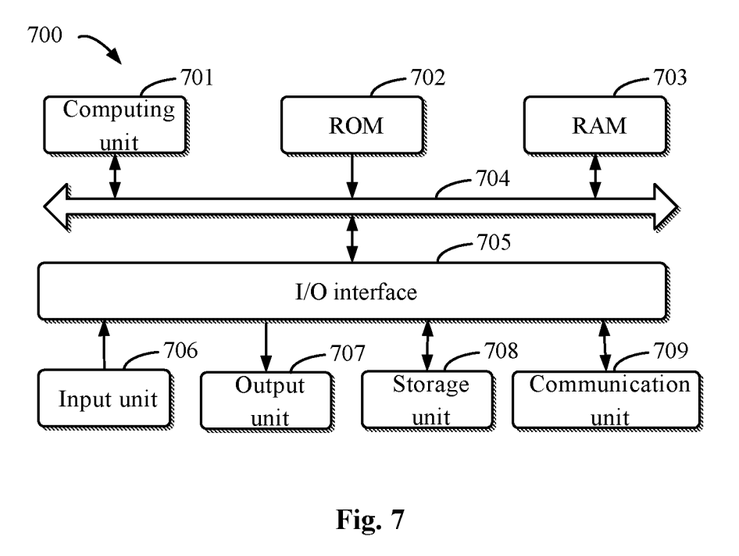
FIG. 7 is a block diagram of an electronic device configured to implement the translation method according to some embodiments of the present disclosure.

FIG. 7 shows a schematic block diagram of an exemplary electronic device 700 which may be configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 7, the device 700 includes a computing unit 701 which may perform various appropriate actions and processing operations according to a computer program stored in a read only memory (ROM) 702 or a computer program loaded from a storage unit 708 into a random access memory (RAM) 703. Various programs and data necessary for the operation of the device 700 may be also stored in the RAM 703. The computing unit 701, the ROM 702, and the RAM 703 are connected with one other through a bus 704. An input/output (I/O) interface 705 is also connected to the bus 704.

The multiple components in the device 700 are connected to the I/O interface 705, and include: an input unit 706, such as a keyboard, a mouse, or the like; an output unit 707, such as various types of displays, speakers, or the like; the storage unit 708, such as a magnetic disk, an optical disk, or the like; and a communication unit 709, such as a network card, a modem, a wireless communication transceiver, or the like.

The communication unit 709 allows the device 700 to exchange information/data with other devices through a computer network, such as the Internet, and/or various telecommunication networks.

The computing unit 701 may be a variety of general and/or special purpose processing components with processing and computing capabilities. Some examples of the computing unit 701 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 701 performs the methods and processing operations described above, such as the method according to the present disclosure. For example, in some embodiments, the method according to the present disclosure may be implemented as a computer software program tangibly contained in a machine readable medium, such as the storage unit 708. In some embodiments, part or all of the computer program may be loaded and/or installed into the device 700 via the ROM 702 and/or the communication unit 709. When the computer program is loaded into the RAM 703 and executed by the computing unit 701, one or more steps of the method according to the present disclosure may be performed. Alternatively, in other embodiments, the computing unit 701 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing device, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A machine translation method implemented by a computer, comprising:
    acquiring an intermediate translation result generated by each of multiple translation models for a to-be-translated specified sentence in a same iteration of a translation process, so as to obtain multiple intermediate translation results; wherein each of the multiple translation models generates a complete sentence translation result through multiple iterations, several words are selected and fixed in each iteration and used for generating other words in subsequent iteration;
    acquiring one or more co-occurrence words by comparing the multiple intermediate translation results generated in each same iteration;
    controlling translation models which generated intermediate translation results including the one or more co-occurrence words to implement a subsequent iteration based on the one or more co-occurrence words;
    obtaining at least two candidate translation results including multiple co-occurrence words generated respectively by at least two translation models in a last iteration; and
    acquiring a target translation result of the specified sentence from the at least two candidate translation results.

2. The method according to claim 1, wherein the acquiring the target translation result of the specified sentence from the at least two candidate translation results comprises:
    acquiring, according to a probability of each candidate translation result, the candidate translation result with the highest probability from the at least two candidate translation results as the target translation result of the specified sentence.

3. The method according to claim 1, further comprising:
    detecting whether a iteration is a last iteration; and
    if the iteration is the last iteration, taking the intermediate translation result including the multiple co-occurrence words as a candidate translation result.

4. The method according to claim 3, wherein
    if the iteration is not the last iteration, controlling a corresponding translation model which generated an intermediate translation result including the one or more co-occurrence words to implement a subsequent iteration based on the one or more co-occurrence words.

5. The method according to claim 1, wherein the multiple translation models are non-autoregressive translation models.

6. An electronic device, comprising:
    at least one processor; and
    a memory connected with the at least one processor communicatively;
    wherein the memory stores instructions executable by the at least one processor to cause the at least one processor to perform a machine translation method comprising:
    acquiring an intermediate translation result generated by each of multiple translation models for a to-be-translated specified sentence in a same iteration of a translation process, so as to obtain multiple intermediate translation results; wherein each of the multiple translation models generates a complete sentence translation result through multiple iterations, several words are selected and fixed in each iteration and used for generating other words in subsequent iteration;
    acquiring one or more co-occurrence words by comparing the multiple intermediate translation results generated in each same iteration;
    controlling translation models which generated intermediate translation results including the one or more co-occurrence words to implement a subsequent iteration based on the one or more co-occurrence words;

obtaining at least two candidate translation results including multiple co-occurrence words generated respectively by at least two translation models in a last iteration; and acquiring a target translation result of the specified sentence from the at least two candidate translation results.

7. The electronic device according to claim 6, wherein the acquiring the target translation result of the specified sentence from the at least two candidate translation results comprises:

acquiring, according to a probability of each candidate translation result, the candidate translation result with the highest probability from the at least two candidate translation results as the target translation result of the specified sentence.

8. The electronic device according to claim 6, further comprising:

detecting whether a iteration is a last iteration; and if the iteration is the last iteration, taking the intermediate translation result including the multiple co-occurrence words as a candidate translation result.

9. The electronic device according to claim 8, wherein if the iteration is not the last iteration, controlling a corresponding translation model which generated an intermediate translation result including the one or more co-occurrence words to implement a subsequent iteration based on the one or more co-occurrence words.

10. The electronic device according to claim 6, wherein the multiple translation models are non-autoregressive translation models.

11. A non-transitory computer readable storage medium with computer instructions stored thereon, wherein the computer instructions are used for causing a computer to perform a machine translation method comprising:

acquiring an intermediate translation result generated by each of multiple translation models for a to-be-translated specified sentence in a same iteration of a translation process, so as to obtain multiple intermediate translation results; wherein each of the multiple translation models generates a complete sentence translation result through multiple iterations, several words are selected and fixed in each iteration and used for generating other words in subsequent iteration;

acquiring one or more co-occurrence words by comparing the multiple intermediate translation results generated in each same iteration;

controlling translation models which generated intermediate translation results including the one or more co-occurrence words to implement a subsequent iteration based on the one or more co-occurrence words;

obtaining at least two candidate translation results including multiple co-occurrence words generated respectively by at least two translation models in a last iteration; and acquiring a target translation result of the specified sentence from the at least two candidate translation results.

12. The non-transitory computer readable storage medium according to claim 11, wherein the acquiring the target translation result of the specified sentence from the at least two candidate translation results comprises:

acquiring, according to a probability of each candidate translation result, the candidate translation result with the highest probability from the at least two candidate translation results as the target translation result of the specified sentence.

13. The non-transitory computer readable storage medium according to claim 11, further comprising:

detecting whether the iteration is a last iteration; and if the iteration is the last iteration, taking the intermediate translation result including the multiple co-occurrence words as a candidate translation result.

14. The non-transitory computer readable storage medium according to claim 13, wherein if the iteration is not the last iteration, controlling a corresponding translation model which generated an intermediate translation result including the one or more co-occurrence words to implement a subsequent iteration based on the one or more co-occurrence words.

\* \* \* \* \*